United States Patent [19]

Harlan

[11] Patent Number: 5,168,269
[45] Date of Patent: Dec. 1, 1992

[54] MOUSE DRIVEN REMOTE COMMUNICATION SYSTEM

[75] Inventor: Duncan C. Harlan, Livonia, Mich.
[73] Assignee: Norton-Lambert Corp., Santa Barbara, Calif.
[21] Appl. No.: 610,710
[22] Filed: Nov. 8, 1990
[51] Int. Cl.⁵ .............................................. G09G 3/02
[52] U.S. Cl. .................................. 340/709; 340/717; 364/188
[58] Field of Search ................. 340/709, 717; 364/188

[56] References Cited

U.S. PATENT DOCUMENTS

| | | | |
|---|---|---|---|
| 4,190,835 | 2/1980 | Buynak | 340/711 |
| 4,317,956 | 3/1982 | Torok et al. | 340/709 |
| 4,414,621 | 11/1983 | Bown et al. | 364/188 |
| 4,698,625 | 10/1987 | McCaskill et al. | 340/709 |
| 4,975,690 | 12/1990 | Torres | 340/721 |

FOREIGN PATENT DOCUMENTS

2190569  5/1987  United Kingdom ............... 340/717

*Primary Examiner*—Alvin E. Oberley
*Assistant Examiner*—Amare Mengistu
*Attorney, Agent, or Firm*—Elmer Galbi

[57] ABSTRACT

The present invention provides a system which has a first computer (herein termed the SUPPORT PC) and second remotely located computer (herein termed the CUSTOMER PC). The SUPPORT PC and the CUSTOMER PC each have a display. The image displayed on the CUSTOMER PC's display is transmitted to and duplicated on the SUPPORT PC's display. The SUPPORT PC is equipped with an analog input device (such as a mouse), the efficient operation of which requires immediate visual feedback. Signals from the input device are transmitted to the remote CUSTOMER PC. The images which appear on the display of the remote CUSTOMER PC are transmitted, relatively slowly, to the display of the SUPPORT PC. In order to provide immediate visual feedback to the operator of the input device at the SUPPORT PC, a Dynamic Temporary Dual Cursor is shown on the screen of the SUPPORT PC along with the regular cursor which is transmitted from the CUSTOMER PC. The Dynamic Temporary Dual Cursor is moved in quick synchronization with movement of the input device, that is, the Dynamic Temporary Dual Cursor moves in direct response to the input device. In due time the image of the cursor transmitted from the remote CUSTOMER PC coincides with and merges with the image of the Dynamic Temporary Dual Cursor.

10 Claims, 9 Drawing Sheets

FIG. 1A

MOUSE CALLS USED

| | |
|---|---|
| RESET MOUSE DRIVER | TURNS CURSOR OFF, SET X AND Y POSITION REGISTERS TO ZERO |
| SHOW CURSOR | TURNS CURSOR ON |
| GET CURRENT STATUS | TELLS POSITION OF MOUSE AND STATUS OF BUTTON: RETURNS MOUSE X POSITION MOUSE Y POSITION BUTTON STATUS |
| SET MOUSE POSITION | TELLS MOUSE DRIVER TO MOVE MOUSE TO NEW POSITION: INPUTS NEW X POSITION NEW Y POSITION |

MOUSE DRIVEN REMOTE COMMUNICATION SYSTEM

FIELD OF THE INVENTION

The present invention relates to electronic computers and more particularly to remotely operated computers.

BACKGROUND AND PRIOR ART

Personal computers which have modems for communicating data to other personal computers are in widespread use.

In many situations a person operating a personal computer at one location requires support, guidance or help from another person who is at a different physical locations. Several commercially available computer programs provide a mechanism whereby two computers connected by modem can be made to operate in tandem. That is, whatever appears on the screen of one computer (herein termed the CUSTOMER PC) identically appears on the screen of the other computer (herein termed the SUPPORT PC). Using such a program an expert sitting at the SUPPORT PC can see exactly what is appearing at the screen of the CUSTOMER PC and the expert can therefore easily help or provide guidance to the person operating the CUSTOMER PC. Among the commercial programs that provide this general type of facility for IBM personal computers (and for what are generally termed IBM PC compatible computers) are: (1) A program sold under the trademark, CLOSE-UP, by Norton-Lambert Corp. of Santa Barbara Calif., (2) A program sold under the trademark CO-SESSION by Triton Technologies Inc. of Iselin N.J., and (3) A program sold under the trademark CARBON COPY by Microcom Systems Inc. of Norwood, Mass. Other programs of this type are described in the magazine entitled "PC Magazine" dated Jun 12, 1990.

There are also programs of this type available for the Macintosh personal computer sold by Apple Computer Corp. However, program which operate on the Macintosh always write to the display screen through the BIOS or Display Driver, whereas program for the IBM PC often bypass the BIOS and Screen Driver and write directly to the display, that is, they write directly to the memory that is used to refresh the display. Thus with the IBM PC it is necessary to scan the display (i.e. scan the memory used to refresh the display) to insure that one has detected all changes that have occurred on the screen, whereas with the Macintosh it is merely necessary to intercept or monitor all commands that are sent to the display driver and to transfer these commands between the two computers.

It is possible to quickly transfer screens of character data (or in the case of the Macintosh the commands going to the display driver) from the CUSTOMER PC to the SUPPORT PC; however, it takes considerably more time to transfer a screen (or even a portion of a screen) of graphic information.

The delay in transmitting graphic information between computers is particularly troublesome when the computers are equipped with an input device which requires visual feedback, such as a mouse. With a device such as a mouse, the operator's physical movement is keyed to the image which is seen on the screen. If due to the delay in transmission of images between computers, the operator does not see the result of his physical mouse movement on the display, the operator tends to become confused and to move the mouse an excessive amount thereby overshooting the desired location.

SUMMARY OF THE PRESENT INVENTION

The present invention provides a system which has a first computer (herein termed the SUPPORT PC) and second remotely located computer (herein termed the CUSTOMER PC). The SUPPORT PC and the CUSTOMER PC each have a display. The image displayed on the CUSTOMER PC's display is transmitted to and duplicated on the SUPPORT PC's display. The SUPPORT PC is equipped with an analog input device (such as a mouse), the efficient operation of which requires immediate visual feedback. Signals from the input device are transmitted to the remote CUSTOMER PC. The images which appear on the display of the remote CUSTOMER PC are transmitted, relatively slowly, to the display of the SUPPORT PC. In order to provide immediate visual feedback to the operator of the input device at the SUPPORT PC, a Dynamic Temporary Dual Cursor is shown on the screen of the SUPPORT PC along with the regular cursor which is transmitted from the CUSTOMER PC. The Dynamic Temporary Dual Cursor is moved in quick synchronization with movement of the input device, that is, the Dynamic Temporary Dual Cursor moves in direct response to the input device. In due time the image of the cursor transmitted from the remote CUSTOMER PC coincides with and merges with the image of the Dynamic Temporary Dual Cursor.

DETAILED DESCRIPTION OF AN EMBODIMENT OF THE INVENTION

Figure 1A:
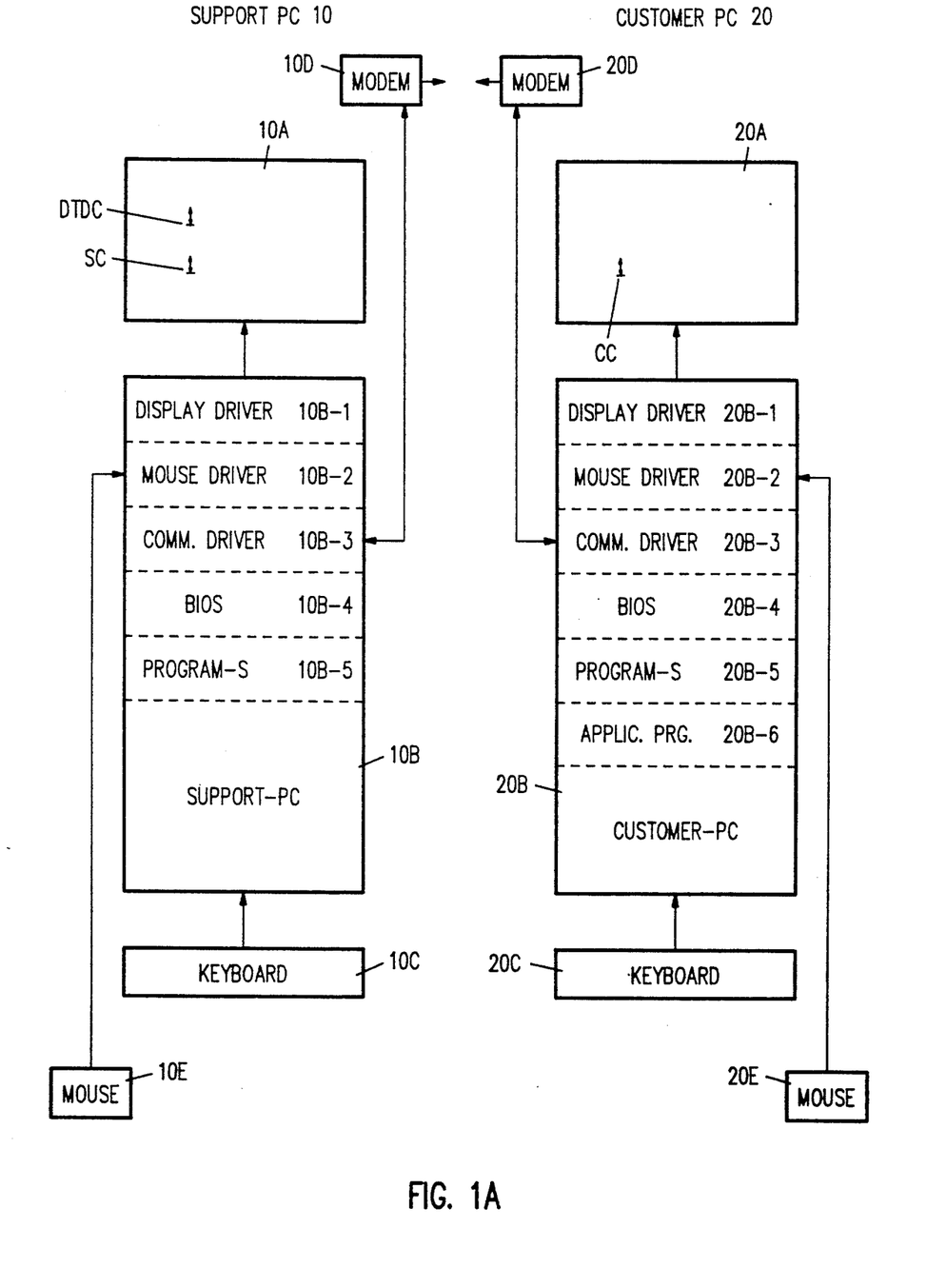
FIG. 1A is an overall diagram of the system of the present invention.

The preferred embodiment of the invention described herein is generally shown in FIG. 1A. Modems 10D and 20D connect a personal computer 10, termed the SUPPORT PC to a second personal computer 20 which is termed the CUSTOMER PC. The personal computers 10 and 20 would normally be located in different physical locations which could be hundreds or thousands of miles apart.

SUPPORT PC 10 has a VGA graphics display 10A, a system unit 10B, a keyboard 10C and a mouse 10E. CUSTOMER PC 20 has a VGA graphics display 20A, a system unit 20B, a keyboard 10C and a mouse 10E. Computers 10 and 20 can for example be personal computers of the type sold by International Business Machines as model 50, PS2 computers.

As will be explained in detail later, the system operates so that the screens of data which appear on display 10A of SUPPORT PC 10 ar (except for the appearance of the cursor) identical to the screens of data that appear on display 20A of CUSTOMER PC 20. The object of the system is to enable a skilled person at SUPPORT PC 10 to see on display 10A what is happening at CUSTOMER PC 20 and to provide the operator of CUSTOMER PC 20 with help and guidance.

A cursor CC which can be moved by mouse 20E appears on the display 20A. As cursor CC moves (or as any other changes occur in the image on display 20A) the system transfers the changes which appear on display 20A from CUSTOMER PC display 20A to SUPPORT PC display 10A. Display 10A has a cursor SC the position of which tracks the position as cursor CC on display 20A. When cursor CC moves, the cursor SC moves at a somewhat later time due to the time required to transmit graphic data from the CUSTOMER PC 10 to the SUPPORT PC 20.

The location of cursor CC can be moved by either (1) the operator of CUSTOMER PC 20 using mouse 20E (2) the operator of SUPPORT PC 10 using mouse 10E or (3) by application program 20B-6. If the cursor CC is moved by the operator of CUSTOMER PC 20 using the mouse 20E, the operator of CUSTOMER PC 20 will see the cursor CC move in substantial synchronization with the moves of mouse 20E. This is conventional and it provides the operator with visual feedback which facilitates moving the cursor CC to a desired position.

The keyboard 10C and the mouse 10E provide input to CUSTOMER PC 20. Keyboard 10C and mouse 10E can provide input signals which change the image on display 20A of CUSTOMER PC 20. When such changes occur on display 20A, they are transmitted back to SUPPORT PC 10 and they appear on display 10A. Of particular importance is the fact that the cursor CC on screen 20A can also be moved by the operator of SUPPORT PC 10 using mouse 10E. It is again noted that SUPPORT PC 10 would generally be remote from CUSTOMER PC 20. When cursor CC is moved by the operator of SUPPORT PC 10, the motion of cursor SC on display 10A lags, by a considerable amount, the actual motion of the mouse 10E. The reason for this is the fact that a relatively long time period is required to move graphic data from CUSTOMER PC 20 to SUPPORT PC 10. Since the motion of cursor SC lags behind the motion of mouse 10E, the motion of cursor SC does not provide the operator of SUPPORT PC 10 with the nearly instantaneous optical feedback that is required to efficiently operate a mouse.

The present invention provides a second cursor DTDC, termed a *Dynamic Temporary Dual Cursor*, on screen 10A. The Dynamic Temporary Dual Cursor DTDC tracks the motion of mouse 10E substantially instantaneously. Thus when mouse 10E is moved, first, Dynamic Temporary Dual Cursor DTDC moves providing the operator with the necessary optical feedback. At a later time cursor SC moves. Ultimately, if the motion of mouse 10E stops, the cursor SC and DTDC coincide and merge into one cursor. When mouse 10E at SUPPORT PC 10 is moved, the following actions take place:

1) The location of the Dynamic Temporary Dual Cursor DTDC on display 10A is moved as mouse 10E moves.
2) The mouse movement data is transferred from SUPPORT PC 20 to the CUSTOMER PC 10 and the cursor CC is moved appropriately.
3) The new screen data on display 20A of CUSTOMER PC 20 (which includes the new location of cursor CC) is transferred to the display 10A of SUPPORT PC 10 thereby moving the location of cursor SC.
4) Eventually cursor SC and the cursor DTDC on display 10A coincide and merge into one cursor.

When mouse 10E is moved, the location of cursor SC and the cursor DTDC diverge. The location of the Dynamic Temporary Dual Cursor DTDC gives the operator the required optical feedback. As the graphic data is relatively slowly transferred, the positions of cursor DTDC and SC are made to coincide. Thus with the present invention the Dynamic Temporary Dual Cursor DTDC is used to provide immediate optical feedback to the operator of SUPPORT PC 10, yet the screen of SUPPORT PC 10 is always updated from the screen of CUSTOMER PC 20. Through the use of Dynamic Temporary Dual Cursor DTDC, the operator of SUPPORT PC 10 receives immediate feedback to help him position the cursor CC and (and subsequently cursor SC) to a desired position.

It is contemplated (but not explicitly shown herein) that for each SUPPORT PC 10 there would be a large number of CUSTOMER PCs 20. However, with a normal telephone modem, at any one time the SUPPORT PC 10 would only be connected to one particular CUSTOMER PC 20. With what is known as a LAN type of connection, a SUPPORT PC 10 could be connected to a large number of CUSTOMER PCs 20.

The system and its operation will now be explained in more detail. As shown herein the system is applied to an IBM Personal computer. The system could also be any one of the commercially available computers that are generally termed IBM compatible. As shown display device 10A and 20A are what are termed VGA graphic displays. Alternatively, these displays could be any of the other graphic displays that are commercially available for IBM personal computers.

In the following discussion the following designations are used:

MOUSE-SX the value of the x coordinate for the Dynamic Temporary Dual Cursor DTDC on display 10A of SUPPORT PC 10. This value is stored in mouse driver 10B-2.

MOUSE-SY the value of the y coordinate for the Dynamic Temporary Dual Cursor DTDC on display 10A of SUPPORT PC 10. This value is stored in mouse driver 20B-2.

MOUSE-SB the status of the mouse button on mouse 10E. This value stored in mouse driver 20B-2.

MOUSE-CX the value of the x coordinate for cursor CC on display 20A of CUSTOMER PC 20. This value is stored in mouse driver 10B-2.

MOUSE-CY the value of the y coordinate for cursor CC on display 20A of CUSTOMER PC 20. This value is stored in mouse driver 10B-2.

MOUSE-CB the status of the mouse button on mouse 10E. This value is stored in mouse driver 10B-2.

CUSTOMER-X the value of the x coordinate of cursor cc. This value is stored by Program-C 20B-5.

CUSTOMER-Y the value of the y coordinate of cursor cc. This value is stored by Program-C 20B-5.

CUSTOMER-B as explained later there is no need to maintain this value as the status of the mouse buttons is not sent to the SUPPORT-PC.

SUPPORT-X the value of the x coordinate of the Dynamic Temporary Dual Cursor DTDC. This value is stored by Program-S 10B-5.

SUPPORT-Y the value of the y coordinate of the Dynamic Temporary Dual Cursor DTDC. This value is stored by Program-S 10B-5.

SUPPORT-B the value of the status of the buttons on mouse 10E. This value is stored by Program-S 10B-5.

SUPPORT PC 10 and CUSTOMER PC 20 include system or central processing units 10B and 20B. As is conventional system units 10B and 20B have a number of programs stored in their memory (not explicitly shown). Some but not all of these programs are shown in FIG. 1. The programs that are relevant to the present invention are display drivers 10B-1 and 20B-1, mouse drivers 10B-2 and 20B-2, communication drivers 10B-3 and 20B-3, BIOS programs 10B-4 and 20B-4 and programs 10B-5, 20B-5, and 20B-6. The display driver 10B-1 and 20B-1, the mouse drivers 10B-2 and 20B-2, communication drivers 10B-3 and 20B-3 and BIOS programs 10B-4 and 20B-4 are well known conventional programs that are in widespread use. For example Comm Drivers 10B-3 and 20B-3 can be the type of programs available in the COMMLIB available from Greenleaf Software Inc. of Dallas Tex. Other specific examples of such programs can be found in libraries such as the on-line commercial data base number 275 (Computer Database by Information Access Company) available on the Dialog Information System. Detailed explanation of such programs can be found in a variety of commercially available books which deal with Personal computers and programming. For example see "Programmer's Guide to the IBM PC" by Peter Norton which is published by Microsoft Press.

Figure 1B:
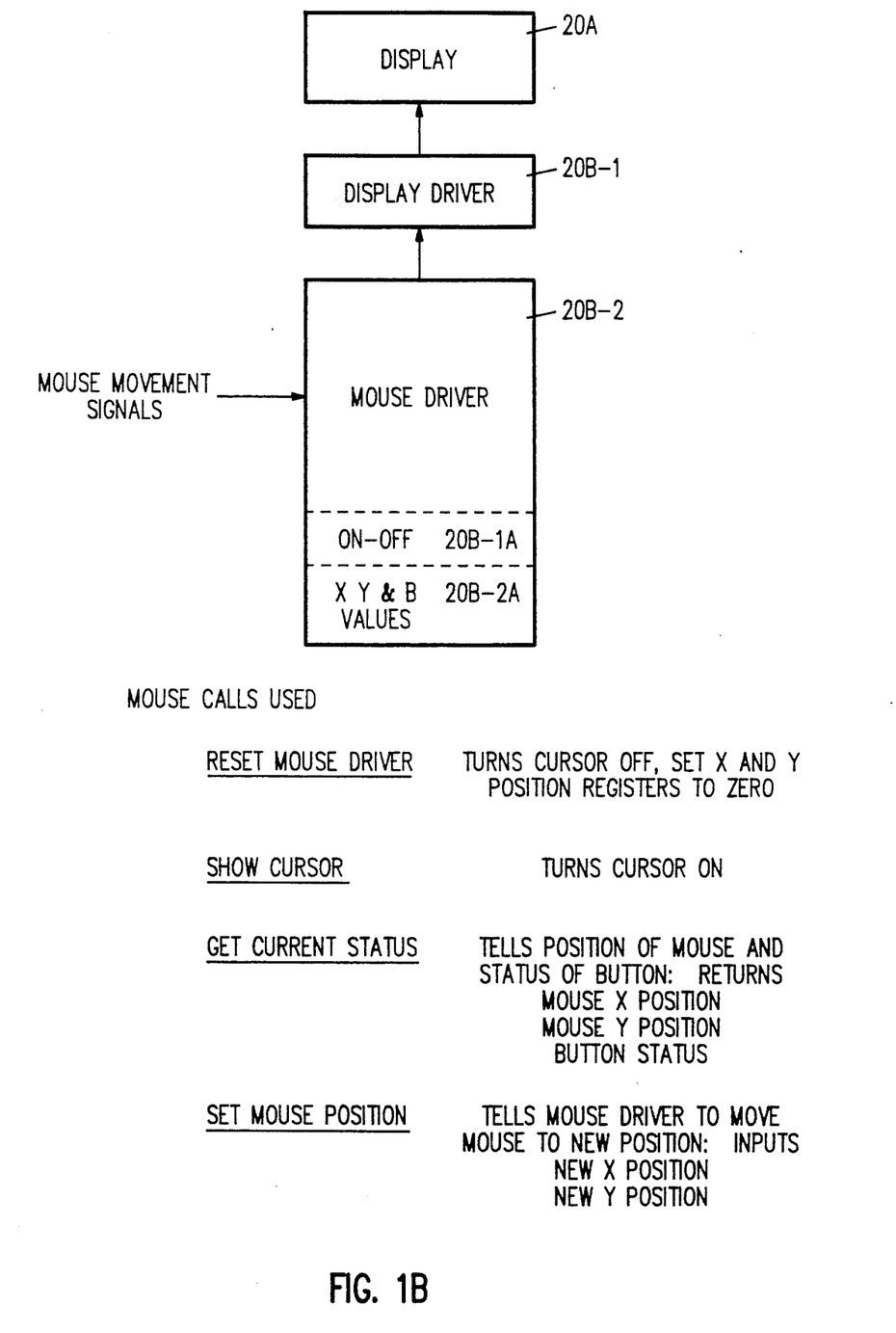
FIG. 1B is a diagram showing the connections to the mouse driver and showing some of the commands to which such a driver responds.
Figure 1C:
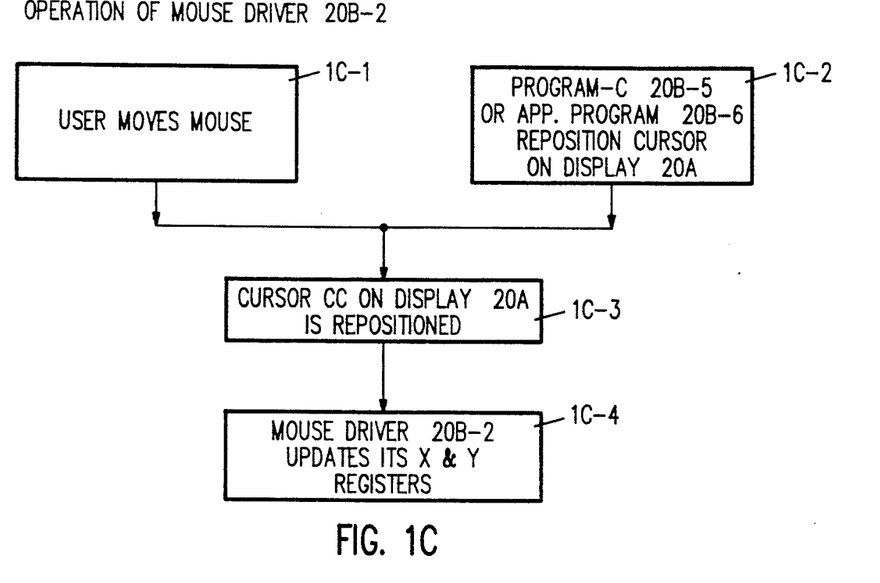
FIG. 1C is a flow diagram showing the operation of a mouse driver.

FIGS. 1B and 1C provide more detail concerning mouse drivers 10B-2 and 20B-2. While only mouse driver 20B-2 is shown in FIG. 1B, it should be understood that the explanation also applies to mouse driver 10B-2 except to the extent that differences are hereinafter noted. As shown in FIG. 1B, mouse driver 20B-2 provides signals to display driver 20B-1 which in turn displays a cursor or pointer on display 20A indicating the location and movement of mouse 20E. Mouse Driver 20B-2 receives mouse movement signals from mouse 20E, and from Program-S 20B-2. Mouse driver 20B-2 also receives signals from BIOS 20B-4. Internal to the mouse driver, as indicated by boxes 10B-2A and 10B-2B, the mouse driver keeps track of certain information, such as whether the associated cursor is turned on or off and what is the X and Y coordinates of the cursor, that is, what is the value of MOUSE-CX, MOUSE-CY, and MOUSE-CB.

As shown by blocks 1C-1 and 1C-2 in FIG. 1C the mouse driver receives signals from either the mouse itself or from programs 20B-5 and 20B-6 which can alter these values stored in the mouse driver. As shown by block 1C-2 and 1C-4 when the mouse driver receives such signals, it reposition the cursor CC on display 20A and it resets its internal registers to the new MOUSE-CX, MOUSE-CY, and MOUSE-CB values. FIG. 1B also lists the particular mouse driver instructions that are particularly related to the present invention. These instructions are referenced in the flow diagrams that will be explained later hereinafter.

Mouse Drivers 20B-2 and 10B-2 are conventional commercially available mouse drivers. A detailed explanation of mouse drivers 10B-2 and 20B-2 can be found in the commercially available book "Microsoft Mouse Programmer's Reference" by Microsoft Press which is hereby incorporated herein by reference.

Figure 1D:
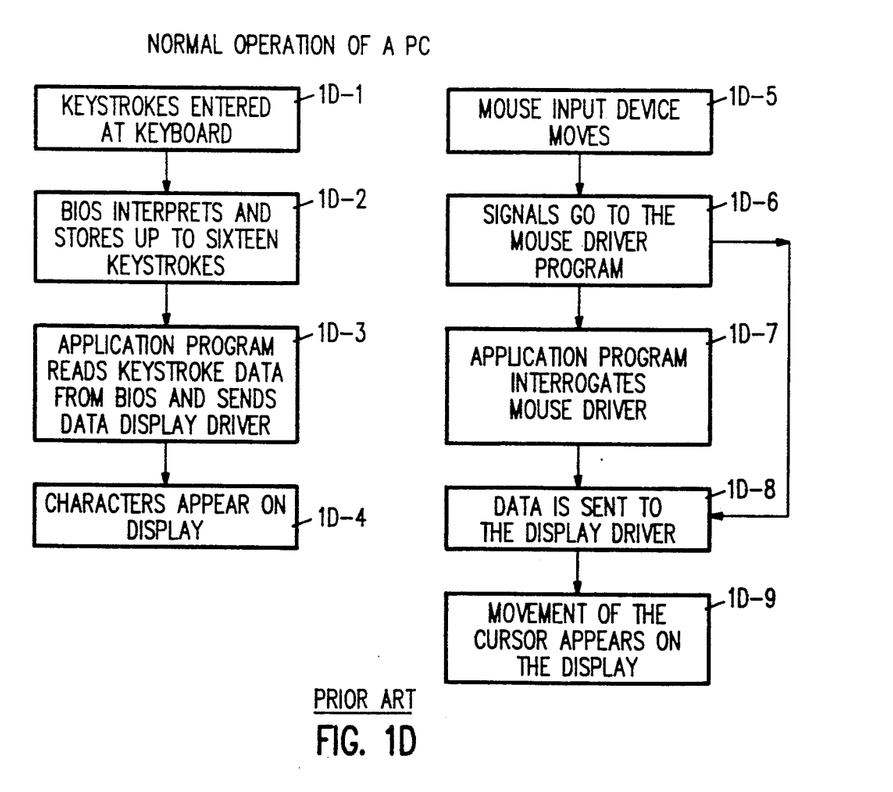
FIG. 1D is a flow diagram showing the conventional interaction between a PC and an input device.

FIG. 1D shows the conventional manner that programs in personal computers 10 and 20 operate when they receive input from keyboard 10C. While the operations shown in FIG. 1D are conventional, they are explained here so as to provide a point of reference for the operation of the invention. As shown in FIG. 1D, and input operation from the keyboard begins with block 1d-1 when keystrokes are entered at the keyboard. As shown by block 1d-2, the BIOS program interprets the keystrokes and stores them in a buffer. Box 1d-3 shows that a program (e.g. such as for example a conventional command interpreter or programs 20B-5, 20B-6 or 10B-5) reads the keyboard buffer and sends the characters to the display driver which causes the characters to appear on the display.

The normal operation of a mouse input device is shown by blocks 1d-5 to 1d-9. Input from a mouse goes to a mouse driver as shown by block 1d-6. As shown by blocks 1D-7 and 1d-8, the output of the mouse driver goes to the application program and to the display driver. The display driver in turn drives the screen. The operations shown in FIG. 1D are explained in detail in various technical reference manuals including those provided by IBM Corporation for the IBM Personal Computers and by Microsoft Corporation for Mouse input devices. The contents of such technical reference manuals are hereby incorporated by reference.

As previously explained when mouse 10E at SUPPORT PC 10 is moved, the following actions take place:

1) The location of the Dynamic Temporary Dual Cursor DTDC on display 10A is moved as mouse 10E moves.
2) The mouse movement data is transferred from SUPPORT PC 10 to the CUSTOMER PC 20 and the cursor CC is moved appropriately.
3) The new screen data on display 20A of CUSTOMER PC 20 (which includes the new location of cursor CC) is transferred to the display 10A of SUPPORT PC 10 thereby moving the location of cursor SC.
4) Eventually cursor SC and cursor DTDC on display 10A coincide and merge into one cursor.

Figure 2A:
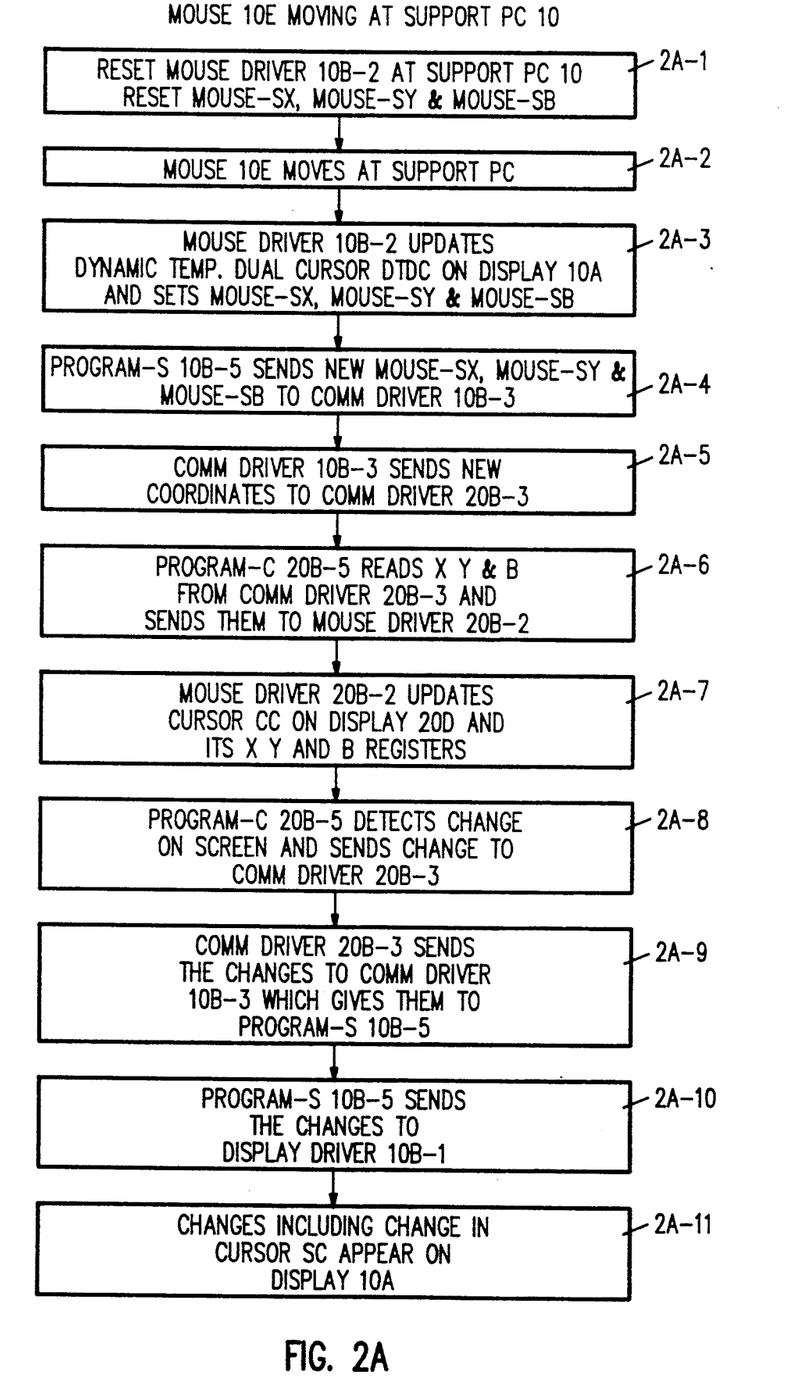
FIG. 2A is a flow diagram showing how the system operates when the mouse at the SUPPORT PC is moved.

FIG. 2A illustrates in some detail how the above sequence of operations occur. For simplicity of explanation as shown in FIG. 2A, the operation begins with the Mouse Driver 10B-2 being reset. When the driver 10B-2 is reset the values of MOUSE-SX, MOUSE-SY and MOUSE-SB are reset to established initial values. Block 2A-3 indicates that when the mouse 10E moves, the mouse driver 10B-2 updates or moves the location of the Dynamic Temporary Dual Cursor DTDC on display 10A and stores the new values of MOUSE-SX, MOUSE-SY and MOUSE-SB.

As indicated by blocks 2A-4 to 2A-6, the new values of MOUSE-SX, MOUSE-SY and MOUSE-SB are sent to PROGRAM-C 20B-5 via comm drivers 10B-3 and 20B-3.

Block 2A-6 and 2A-7 indicates that the new values are sent to Mouse driver 20B-2 via program-C 20B-5 and that mouse driver 20B-2 or application program 20B-C updates the location of cursor CC on display 20D.

Block 2A-8 indicates that program-C 20B-5 detects changes that have occurred on the screen of display 20D and that these changes are sent to comm Driver 20B-3. The changes are detected by comparing a stored copy of the bit map of the previous image to the bit map of the present image.

Program-C 20B-5 maintains a copy of the bit map of the last screen image. Periodically, program-C 20B-5 reads the bit map of the image that is on screen from the memory of the actual hardware that drives the display. The current image is then compared to the stored image and any changes noted. Transmission of changes is facilitated by not comparing total images. The images are compared by comparing small size segments of the images, for example, by comparing corresponding segments that are 20 bytes by 16 lines (that is 320 bytes). Only the segments of the image that have changed are transmitted. Each segment transmitted is preceded by an indication of the segment location on the screen, that is, by a number which indicates which segment is being transmitted. The particular manner that the images are compared and size of the image segments that are transmitted between the computers when the image changes occur is not particularly relevant to the present invention. It is noted that a cursor is usually of the order of 16 by 16 pixels and the cursor may be at a boundary thereby requiring the transfer of more than one segment of an image in order to update the cursor at the SUPPORT PC.

As indicated by block 2A-9, these changes go to Program-S 10B-5 via com Driver 10B-3. Blocks 2A-10 and 2A-11 indicate that the changes go to display driver 10B-1. Finally as indicated by block 2A-12, the changes including the change in cursor SC appear on the screen of display 10A.

Figure 2B:
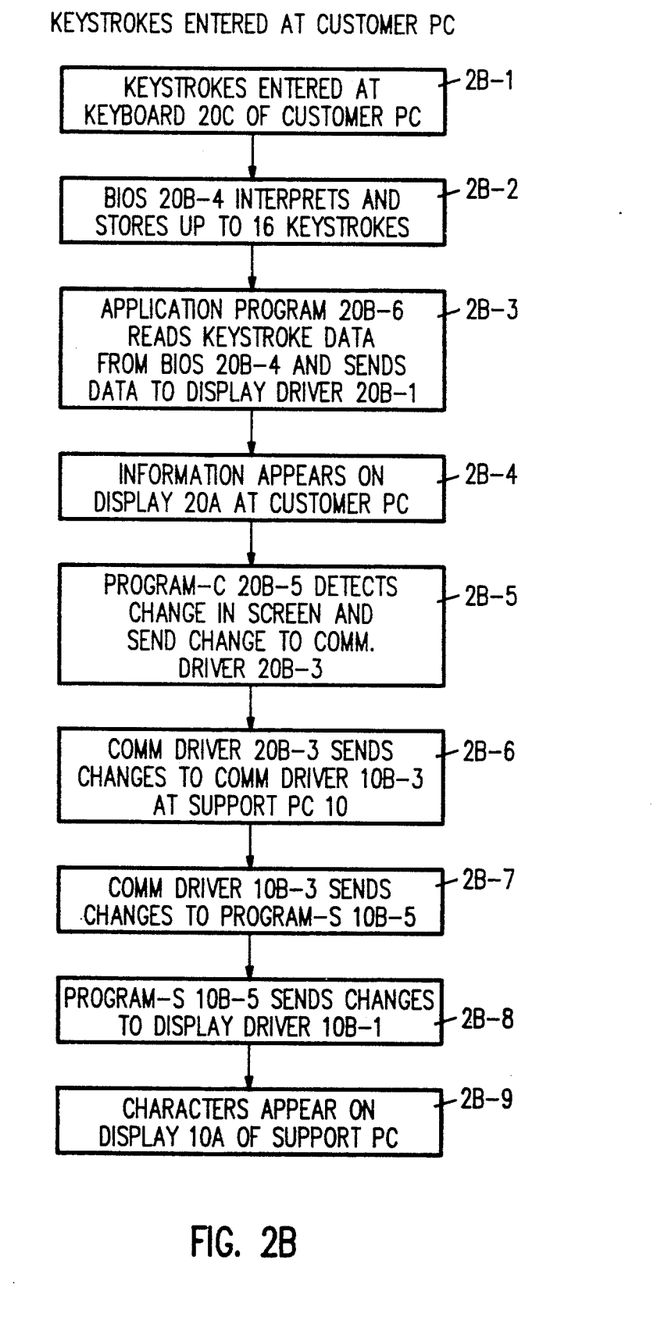
FIG. 2B is a flow diagram showing how the system operates when keystrokes are entered into the system using the keyboard at the CUSTOMER PC.
Figure 2C:
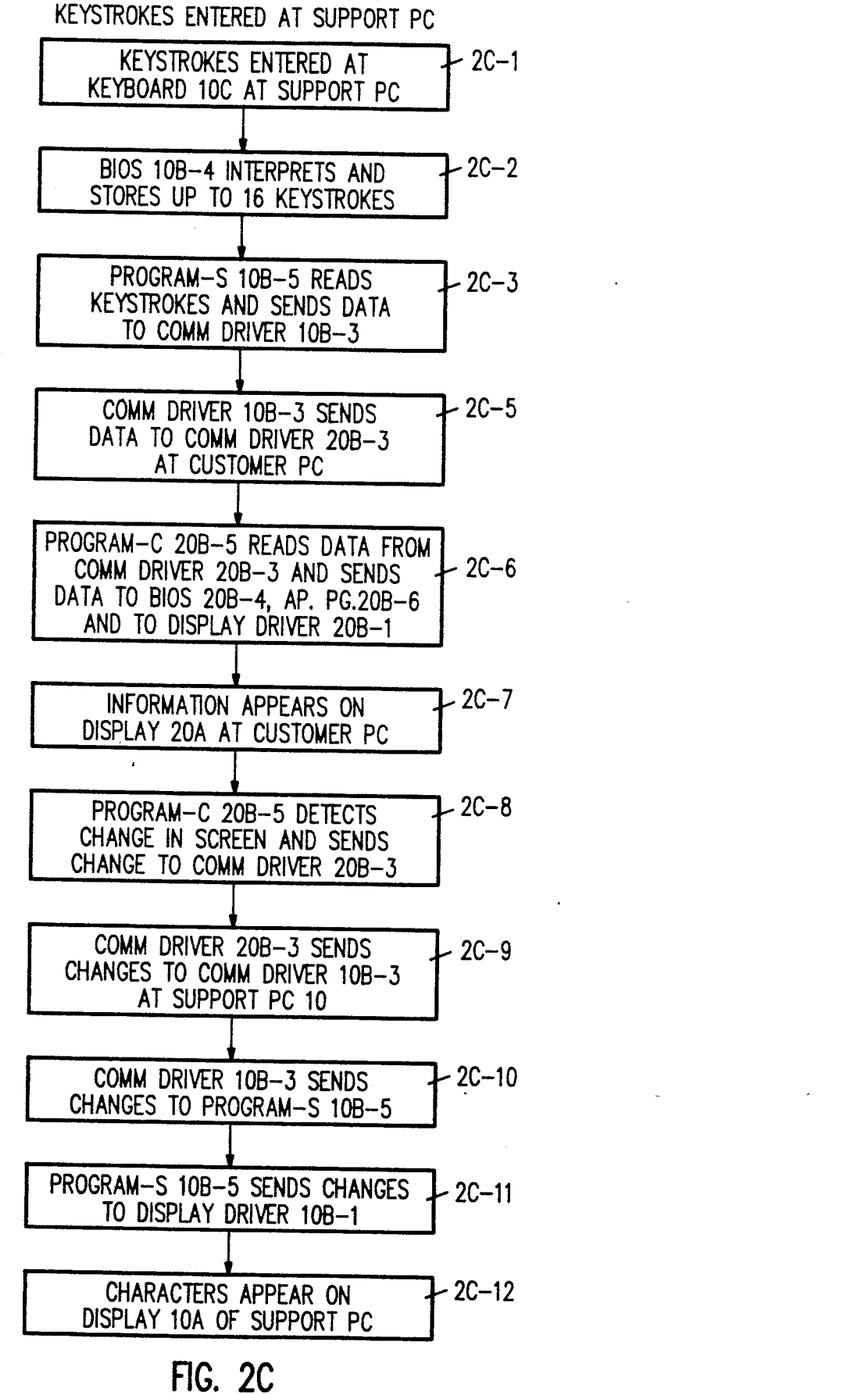
FIG. 2C is a flow diagram showing how the system operates when keystrokes are entered into the system using the keyboard at the SUPPORT PC.

In order to illustrate the need for and advantages of the present invention with its Dynamic Temporary Dual Cursor DTDC and the associated controls, FIGS. 2B and 2C show the operation of the system when only character information is entered into the system via the keyboard 20C.

FIG. 2B shows the operations which occur when keystrokes are entered at Customer PC 20. Blocks 2B-1 to 2B-4 are conventional operations similar to the operations shown in FIG. 1D. Block 2B-5 indicates that program-C 20B-5 detects a change in the information displayed on the screen of display 20A.

As indicated by blocks 2B-6 TO 2B-9, the image changes are sent via com drivers 20B-3 and 10B-3 through modems 20D and 10D to Program-S 10B-5. Program-S sends the changes to display driver 10B-1 and they ultimately appear on display 10A.

The manner that the system handles characters entered at keyboard 10C of SUPPORT PC 10 is shown in FIG. 2C. As indicated by blocks 2C-1 to 2C-7, the keystrokes are read by Program-S 10B-5 and sent to Program-C 20B-5 which sends them to the BIOS 20B-4, from which application program 20B-6 sends then to the display 20A.

Blocks 2C-8 to 2C-12 indicate that the changes on the screen are detected by Program-C 20B-5 and sent to the display 10A on SUPPORT PC 10 similar to the manner (shown in FIG. 2B) that changes due to Keystrokes entered via keyboard 20C are handled.

With keystrokes entered at either keyboard 10C or 20C, there is no problem with respect to operator feedback which is similar to the problem which the operator of a mouse encounters when the operator does not have relatively immediate feedback showing the results of movements that are made. Thus while a pointing device such as a mouse requires optical feedback, in general the operator of a keyboard does not require similar feedback. If however, such feedback was required for the operator of keyboard 10C, the same principle could be applied which is herein shown as applied to a cursor associated with a mouse.

The operation of programs 10B-5 and 20B-5 will now be explained. The general operation will first be given with reference to FIGS. 3A and 3B. A more detailed flow diagram will then be given with reference to FIGS. 4A and 4B. Finally a pseudo code version of the programs will be given.

Figure 3A:
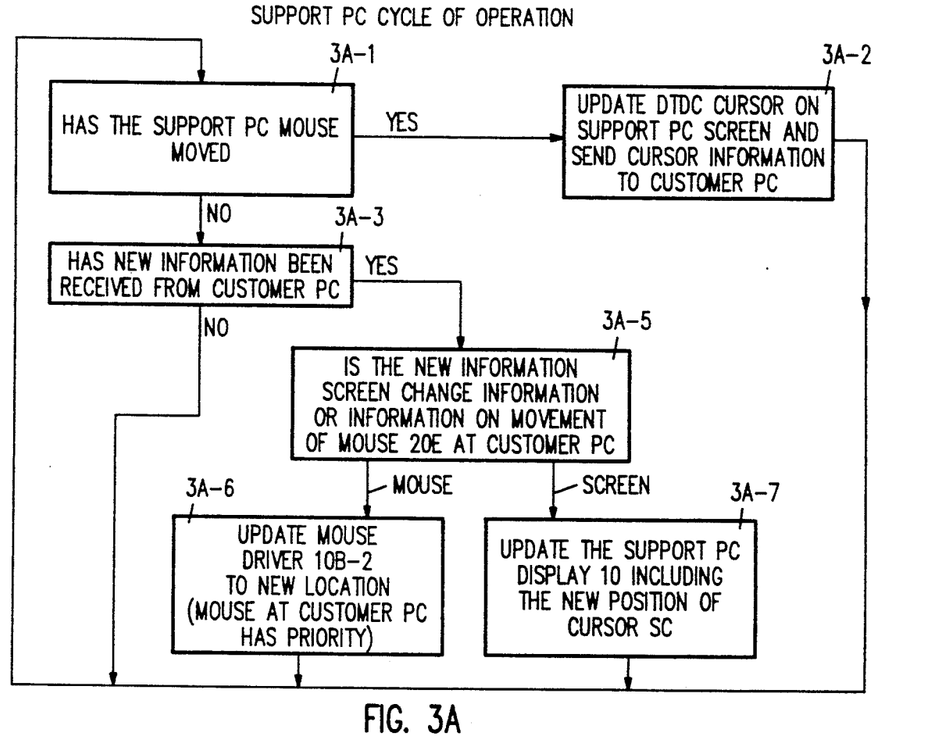
FIG. 3A is a flow diagram showing the overall cycle of operation of the SUPPORT PC.

The cyclical operation of Program-S 10B-5 is shown in FIG. 3A. The cycle begins with block 3A-1 which checks if mouse 10E has moved. If the mouse has moved (block 3A-2) the Dynamic Temporary Dual Cursor DTDC is updated and the new cursor information is sent to the CUSTOMER PC.

In the SUPPORT PC mouse 10E has not moved, a check (block 3A-3) is made to see if new information was received from the CUSTOMER PC 20 via comm driver 10B-3. If no information was received the program recycles. If information was received, a determination is made as to whether it is screen information or mouse movement information. As indicated by block 3A-7 if the information is screen information, display 10 is updated. If the new screen information includes a new position of cursor CC, the position of cursor SC would thereby be updated. In transferring screen information, cursor CC and cursor SC are not separate items of information. They are merely parts of the screen information that is transferred. Changes in the cursor SC are merely transferred to display 10A as any other change in the screen. The difference in designation from CC to SC is merely used herein for ease of reference and ease of explanation.

If the transmitted information is mouse information (block 3A-6) the information is given to mouse driver 10B-2 and mouse driver moves the Dynamic Temporary Dual Cursor DTDC to a new location and updates the values of MOUSE-SX and MOUSE-SY. (Values of the buttons MOUSE-SB is not transmitted since this information is only relevant to application programs in CUSTOMER PC 20. When mouse 20E is moved, the image on screen 10A is changed quite rapidly. Furthermore, if there is a conflict between the movement of mouse 10E and 20E, the movement of mouse 20E takes precedence since the operator at the SUPPORT-PC is trying to help the operator at the CUSTOMER-PC. Further explanation of Program-S 10B-5 will be given later with reference to FIG. 4A.

Figure 3B:
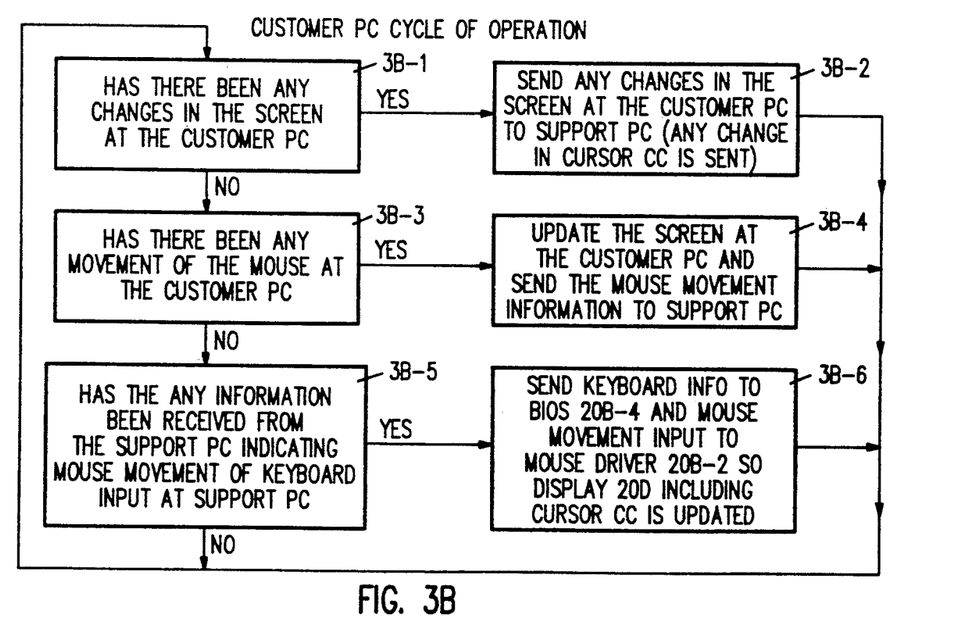
FIG. 3B is a flow diagram showing the overall cycle of operations of the CUSTOMER PC.

The cyclical of operation of Program-C 20B-5 is shown in FIG. 3B. The cycle begins as indicated by block 3B-1 with a determination of whether or not the screen 20A has changed. If there has been any changes in the screen, these changes are sent to the SUPPORT PC 10 (block 3B-2). Changes in cursor CC are sent as a change in screen data similar to any other change.

If there have been no changes in screen data, a check is made for movements of mouse 20E (block 3B-3). If there has been movement of mouse 20E, the cursor CC is updated and the new values of MOUSE-CX and MOUSE-CY are sent to the SUPPORT PC 10 (block 3B-4).

If there has been no movement of mouse 20E, a check is made (block 3B-5) to see if any information has been received from the SUPPORT PC 10. Two kinds of information could have been received, namely, mouse movement information or keyboard information (block 3B-6). If the information is mouse movement information, the information is sent to mouse driver 20B-2 and the cursor CC is updated and new values of MOUSE-CX, MOUSE-CY and MOUSE-CB are stored. If the information is keyboard information, it is sent to BIOS 20B-4, which causes it to be displayed on display 20A.

Figure 4A:
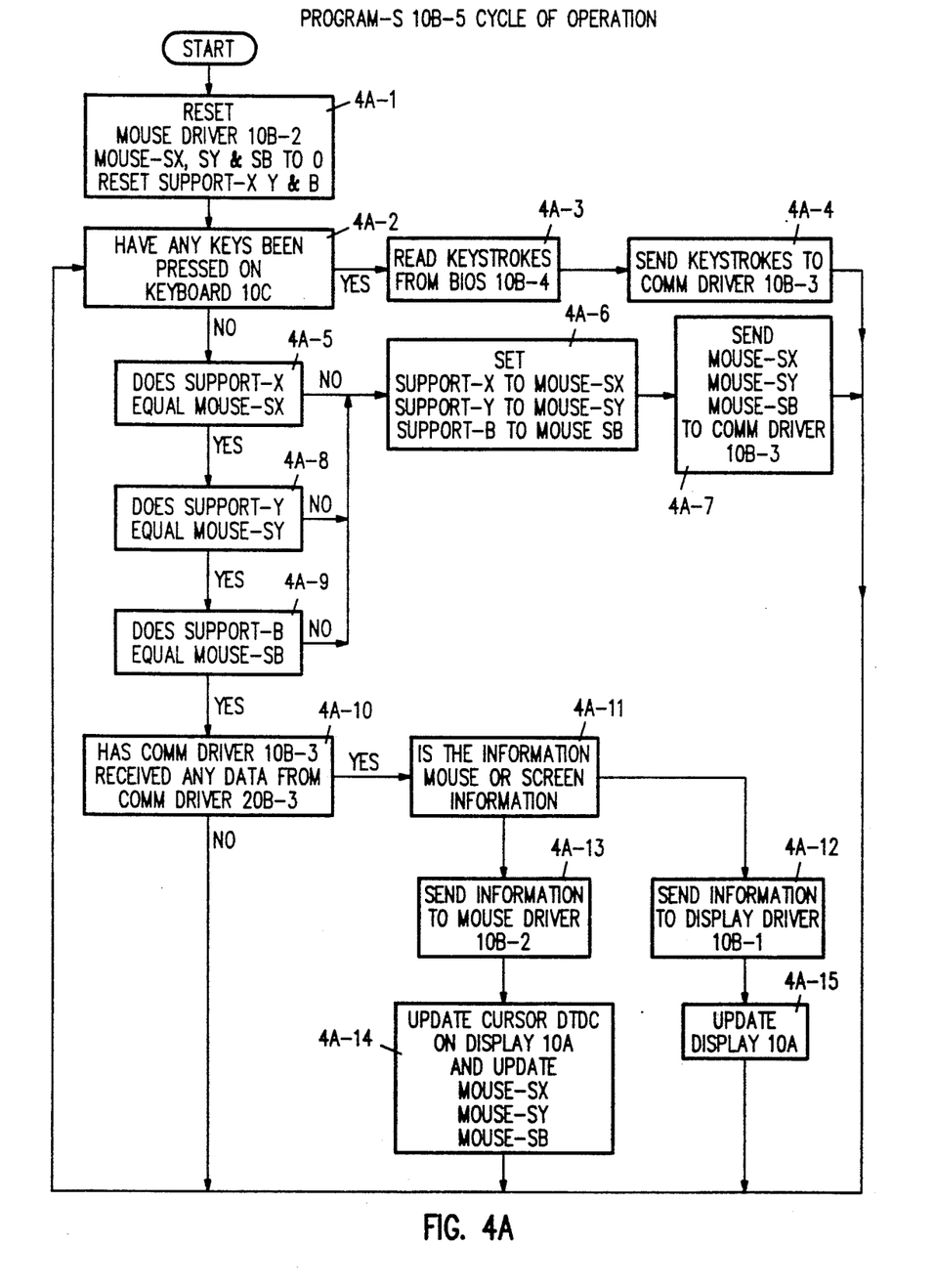
FIG. 4A is a detailed flow diagram of a program which operates the SUPPORT PC.

FIG. 4A is a more detailed program flow diagram of program-S 10B-5. The program begins at block 4A-1 where the mouse driver 10B-2 is reset. At reset the values of MOUSE-SX, MOUSE-SY, and MOUSE-SB are set to an initial value which for the present discussion can be considered to be the value zero. Of importance is the fact that the values SUPPORT-X, SUPPORT-Y, and SUPPORT-B are set to a different initial value, which for the present discussion can be considered to be ten. The reason for setting these initial conditions to different values is so that in the first cycle of the program they will not match and the values of MOUSE-SX, MOUSE-SY and MOUSE-SB will be sent to the CUSTOMER PC 20, thereby coordinating the initial setting of mouse drivers 10B-2 and 20B-2.

Block 4A-2 indicates that the first step is a check to see if any keys on Keyboard 10C has been pressed. This check is made by interrogating BIOS 10B-4. Blocks 4A-3 and 4A-4 indicate that if any keys have been pressed, this information is sent to CUSTOMER-PC 20 via comm driver 10B-3. It is noted that the keystrokes are sent to the CUSTOMER PC and they are not displayed on display 10A. The change in the screen on display 10A will occur after the screen on display 20A is changed.

If no key strokes are detected, blocks 4A-5, 4A-6 and 4A-7 indicated that a check is made to see if there has been any mouse movement. This check is made by comparing MOUSE-SX, etc. with corresponding previous values SUPPORT-X which is stored in (or by) Program-S 10B-5. Blocks 4A-6 and 4A-7 indicate that if there has been mouse movement, the values SUPPORT-X, etc are updated and the new values of MOUSE-SX are sent to CUSTOMER PC 20 via comm driver 10B-3.

If no mouse movement is detected (block 4A-10) a check is made to determine if any data has been received from CUSTOMER PC via comm driver 20B-3. Two types of information could have been received (block 4A-11) namely changes in mouse 20E or changes in the screen on display 20A. As indicated by blocks 4A-13 and 4A-14, if the information is mouse movement information, the Dynamic Temporary Dual Cursor DTDC is updated and the values of MOUSE-SX and MOUSE-SY are updated. Note values of MOUSE-CB are not transmitted since this is not relevant to Program-S 10B-5. If the information is information concerning a change in the screen on display 20A, the information is sent to display driver 10B-1 and the display 10A is updated.

Figure 4B:
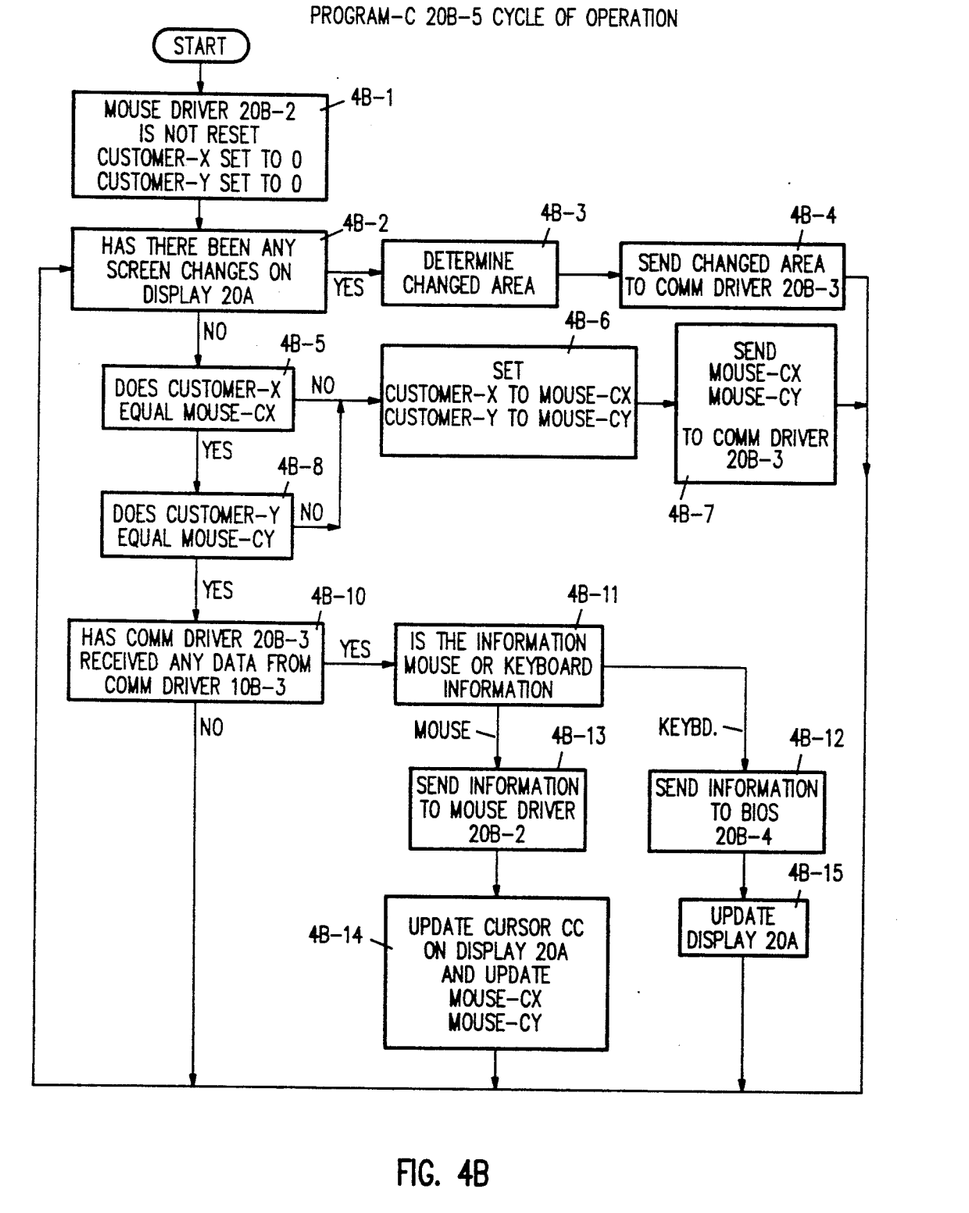
FIG. 4B is a detailed flow diagram of a program which operates the CUSTOMER PC.

FIG. 4B shows the operation of Program-C 20B-5. For convenience the explanation starts with a reset operation at block 4B-1 where mouse driver 20B-2 is reset. At reset only the values of CUSTOMER-X, and CUSTOMER-Y are set to initial values. The values of MOUSE-X, MOUSE-Y and MOUSE-B are set by the application program 20B-6. It is also noted that there is no CUSTOMER-B and that the value of MOUSE-B is not detected and sent to the SUPPORT PC 10. The reason for this is the mouse button settings are only relevant to the application program in CUSTOMER PC 20.

The first step (block 4B-2) determines if there has been any changes in the screen on display 20A. As previously explained the program does this by storing a bit map of the screen and comparing the current screen bit map to the previously stored version. The comparison is made by comparing 20 bit by 20 bit segments of the bit map of the current screen image with the bit map of the previous screen image and determining what if any segments have changed. Changes are sent to SUPPORT PC 10 via Comm Driver 20B-3.

If there has been no changes in the display, a check is made (blocks 4B-5, 4B-8 and 4B-9 TO determine if mouse 20E has moved. This check is made by comparing the value of MOUSE-CX to a previously stored value, herein termed CUSTOMER-X. If there has been movement of the mouse, the value of CUSTOMER-X etc. (block 4B-6) is updated and the values of MOUSE-CX etc is sent to SUPPORT PC 10 vial comm Driver 20B-3 (block4B-7).

If the mouse has not moved a check is made (block 4B-10 and 4B-11) to see if any information has been received by comm driver 20B-3 from SUPPORT PC 10 and if so whether it is mouse movement or keyboard information. If it is keyboard information it is sent to BIOS 20B-4 (block 4B-12) and display 20A is updated (block 4B-15). If the information is mouse movement information, the information is sent to mouse driver 20B-2 and then (block 4B-14) cursor CC is updated and the values of MOUSE-CX, etc. are updated.

The following is pseudo code that implements the operations shown in FIG. 4A.

call mouse driver - reset
    call mouse driver - showcursor
    SUPPORT-X=0
    SUPPORT-Y=0
    SUPPORT-B=0
loop-top:
    call bios - read keyboard status if key pressed
        call bios - read key
        call comm driver - send key
        goto loop-top
    call mouse driver - get mouse status if SUPPORT-X NE MOUSE-SX
        call update-mouse
        goto loop-top
    if SUPPORT-Y NE MOUSE-SY
        call update-mouse
        goto loop-top
    if SUPPORT-B NE MOUSE-SB
        call update-mouse
        goto loop-top
    call comm driver - incoming data status if data waiting
        if data EQ mouse data

```
    SUPPORT-X = CUSTOMER-X
    SUPPORT-Y = CUSTOMER-Y
    call mouse driver - set new curser position
    goto loop-top
    if data EQ screen data
        call display driver - update screen
        goto loop-top
    goto loop-top
update mouse:
    SUPPORT-X = MOUSE-SX
    SUPPORT-Y = MOUSE-SY
    SUPPORT-B = MOUSE-SB
    call comm driver - send mouse info return
```

The following is pseudo code that implements the operations shown in FIG. 4B.

```
    CUSTOMER-X = 0
    CUSTOMER-Y = 0
loop-to:
    call display driver - screen change status if screen changed
        call comm driver - send screen changes
        goto loop-top
    call mouse driver - get mouse status if CUSTOMER-X NE MOUSE-CX
        call update-mouse
        goto loop-top
    if CUSTOMER-Y NE MOUSE-CY
        call update-mouse
        goto loop-top
    call comm driver - incoming data status if data waiting
        if data EQ mouse data
            CUSTOMER-X = SUPPORT-X
            CUSTOMER-Y = SUPPORT-Y
            call mouse driver - set new cursor position
            goto loop-top
        if data EQ keyboard data
            call bios - add key to buffer
            goto loop-top
    goto loop-top
update-mouse:
    CUSTOMER-X = MOUSE-CX
    CUSTOMER-Y = MOUSE-CY
    call comm driver - send mouse info return
```

In the above description the term cursor is used. It should be understood that the term cursor as used herein is synonymous with the term pointer which is sometimes used in the literature. As used herein the term cursor encompasses and includes the term pointer. It should also be understood that while the device which requires visual feedback as shown in this embodiment is a mouse, the spirit and scope of the invention encompasses any and all device which require relatively immediate optical feedback for efficient or desired operation.

It is also noted that as shown herein the two relatively small personal computers are connected by a modem which transmits information over a voice grade telephone line. The invention could also be used with other types of computers which are connected by other types of communication facilities. For example the computers could be the type of computers that are generally termed "work stations" or the small lap top or note pad computers which have communication facilities associated therewith. The communication facility between the computers could be any of the various types LANS or local areas networks that are commercially available.

From the above description of the preferred embodiment of the invention, those skilled in the art will recognize a wide variety of applications for the method and variations appropriate to particular applications and to the operation in data processing systems of various designs.

It would be understood that changes may be made in the combination and arrangement of elements and steps as heretofore set forth in the specification and shown in the drawings; it also being understood that changes may be made in the embodiment disclosed without departing from the spirit and scope of the invention as defined in the following claims.

What is claimed is:

1. In a computer system including a first computer which has a first display associated therewith, and a second computer which has a second display associated therewith, the combination of:

image transfer means connecting said computers for transferring screen images which appear on said second display to said first display, said transfer requiring a period of time whereby a particular image will appear at a particular location on said first display said period of time after said particular image appears at the corresponding particular location on said second display, an input device which requires optical feedback from said first display for efficient operation, said first input device connected to said first computer, first cursor forming means for forming and moving a dynamic temporary dual cursor on said first display in response to motion of said input device, and second cursor forming means for forming and moving a second cursor on said second display in response to motion of said input device, said second cursor being transferred to said first display by said image transfer means, whereby said first display device displays two cursors when said input device is moved, one of said cursors being formed by said first cursor forming means and moving immediately in response to movement of said input device, and the second of said cursors being formed on said second display by said second cursor forming means and being transferred to said first display after a period of time by said image transfer means, said two cursors coinciding after a period of time.

2. The system recited in claim 1 wherein said input device is a mouse.

3. The system recited in claim 1 wherein said computer are small personal computers.

4. The system recited in claim 1 wherein said computer communicate by relatively slow serial communication.

5. The system recited in claim 1 wherein said computer are connected by telephone lines and modems.

6. A system including a CUSTOMER PC which has a first display, and a SUPPORT PC which has a second display, image transfer means connecting said CUSTOMER PC to said SUPPORT PC so that what appears on said first display appears on said second display after a slight time period, said time period being substantially equal to the time required to transmit data from said CUSTOMER computer to said SUPPORT computer, a mouse input device connected to said SUPPORT PC, first cursor forming means for forming and moving a first cursor on said first display in response to motion of said mouse, said image transfer means transferring said image of said cursor to said second display after said slight time period, second cursor forming means for forming and moving a dynamic temporary dual cursor on said second display in response to motion of said mouse input device, after said time period, said dynamic temporary dual cursor coinciding with the image of said first cursor that is transferred from said first display to said second display wherein said dynamic temporary dual cursor provides the operator of said SUPPORT PC with immediate optical feedback to guide the motion of said mouse even thought said first cursor is transferred to said SUPPORT PC only after said time period.

7. A system including a CUSTOMER PC which has a first display, and a SUPPORT PC which has a second display, image transfer means connecting CUSTOMER PC to said SUPPORT PC so that what appears on said first display appears on said second display after a slight time period, said time period being substantially equal to the time required to transmit data from said CUSTOMER computer to said SUPPORT computer, an input device which requires optical feedback connected to said SUPPORT PC, first cursor forming means for forming and moving a first cursor on said first display in response to motion of said input device, said image transfer means transferring said image of said cursor to said second display after said slight time period, second cursor forming means for forming and moving a dynamic temporary dual cursor on said second display in response to motion of said input device, after said time period, said dynamic temporary dual cursor coinciding with the image of said first cursor that is transferred from said first display to said second display whereby said dynamic temporary dual cursor provides the operator of said SUPPORT PC with immediate optical feedback to guide the motion of said input device and said first cursor movement appears on said SUPPORT PC after said slight time period.

8. The system recited in claim 7 wherein said input device is a mouse.

9. The system recited in claim 7 wherein said SUPPORT PC and said CUSTOMER PC are IBM compatible personal computers.

10. A computer system with a display and an input device for an operator, first pointer forming means for providing and moving a first pointer on said display in response to movement of said input device, said first pointer forming means moving said first pointer only after a first delay, second pointer forming means for providing and moving a second pointer on said display in response to movement of said input device, said second pointer forming means moving said second pointer with a delay that is shorter than said first delay, whereby when said input device is moved, for a short period of time, two pointers appear on said display and if said input device is not moved for a time period longer than said first delay, said two pointers merge into one pointer.

* * * * *